Nov. 10, 1964 P. C. FEFFER ETAL 3,156,202
APPARATUS FOR PADDING UNDERCOLLARS
Filed Feb. 16, 1961 13 Sheets-Sheet 1

FIG.1.

INVENTORS
PHILIP C. FEFFER
ALBERT J. HASSELBACH
LOUIS NATALE
BY
Cushman, Darby & Cushman
ATTORNEYS

Nov. 10, 1964   P. C. FEFFER ETAL   3,156,202
APPARATUS FOR PADDING UNDERCOLLARS
Filed Feb. 16, 1961   13 Sheets-Sheet 2

INVENTORS
PHILIP C. FEFFER
ALBERT J. HASSELBACH
LOUIS NATALE
BY *Cushman, Darby & Cushman*
ATTORNEYS Nov. 10, 1964  P. C. FEFFER ETAL  3,156,202
APPARATUS FOR PADDING UNDERCOLLARS
Filed Feb. 16, 1961  13 Sheets-Sheet 4

FIG. 5.

INVENTORS
PHILIP C. FEFFER
ALBERT J. HASSELBACH
LOUIS NATALE
BY Cushman, Darby & Cushman
ATTORNEYS Nov. 10, 1964          P. C. FEFFER ETAL         3,156,202
                  APPARATUS FOR PADDING UNDERCOLLARS
Filed Feb. 16, 1961                           13 Sheets-Sheet 5

INVENTORS
PHILIP C. FEFFER
ALBERT J. HASSELBACH
LOUIS NATALE
BY Cushman, Darby & Cushman
ATTORNEYS

FIG.9.

Nov. 10, 1964  P. C. FEFFER ETAL  3,156,202
APPARATUS FOR PADDING UNDERCOLLARS
Filed Feb. 16, 1961  13 Sheets-Sheet 11

INVENTORS
PHILIP C. FEFFER
ALBERT J. HASSELBACH
LOUIS NATALE
BY Cushman, Darby & Cushman
ATTORNEYS Nov. 10, 1964  P. C. FEFFER ETAL  3,156,202
APPARATUS FOR PADDING UNDERCOLLARS
Filed Feb. 16, 1961  13 Sheets-Sheet 12

INVENTORS
PHILIP C. FEFFER
ALBERT J. HASSELBACH
LOUIS NATALE
BY Cushman, Darby & Cushman
ATTORNEYS

INVENTORS
PHILIP C. FEFFER
ALBERT J. HASSELBACH
LOUIS NATALE

BY Cushman, Darby & Cushman
ATTORNEYS

United States Patent Office 3,156,202
Patented Nov. 10, 1964

3,156,202
APPARATUS FOR PADDING UNDERCOLLARS
Philip C. Feffer, Sparks, Albert J. Hasselbach, Baltimore, and Louis Natale, Baltimore County, Md., assignors to L. Greif & Bro., Nashville, Tenn., a corporation of Tennessee
Filed Feb. 16, 1961, Ser. No. 89,760
5 Claims. (Cl. 112—2)

The present invention relates to an apparatus used in combination with a blind stitch sewing machine for padding a canvas to an undercollar fabric. Canvas is the term given by the trade to the stiff backing material which is padded to the undercollar. The undercollar is that portion of a garment which is placed under the cloth top collar. The undercollar is comprised of a piece of cloth material, to which a canvas is padded to serve as a stiffening.

The present manner of padding undercollars is performed on a blind stitch sewing machine which is under the control of an operator. The operator must first select the piece of cloth and canvas, place them in superimposed relationship in proper relative position to each other and manually guide the two pieces through the sewing machine in successive passes until the desired number of rows of stitches have been applied to the undercollar. In performing this operation, a considerable amount of time is expended and in addition, the application of the stitches is not very accurate. In other words, there may be a varying distance between each of the rows of stitches and the rows may not be in parallel relationship to each other.

The collar padding apparatus as described herein overcomes the above disadvantages by performing the padding operations automatically. That is, the operator will only have to place the undercollar fabric and canvas in superimposed relation in the machine and initiate the operation thereof, and subsequent padding will be carried out automatically.

Additionally, the size of the canvas and undercollar material can be reduced over that which is normally used because of the accuracy with which the rows of stitches are applied through the use of the apparatus as disclosed in the present invention.

An object of the invention is a collar padding apparatus which will perform padding operations with relatively little reliance on the operator.

Another object of the invention is a collar padding apparatus which will pad undercollars with a high degree of accuracy.

Another object of the invention is a collar padding apparatus which will increase the production of padded undercollars.

Another object of the invention is a collar padding apparatus which is relatively simple to operate and requires no special skill on the part of the operator.

Other objects and advantages of the invention will become readily apparent by referring to the following description when taken with the accompanying drawings.

Figure 1:
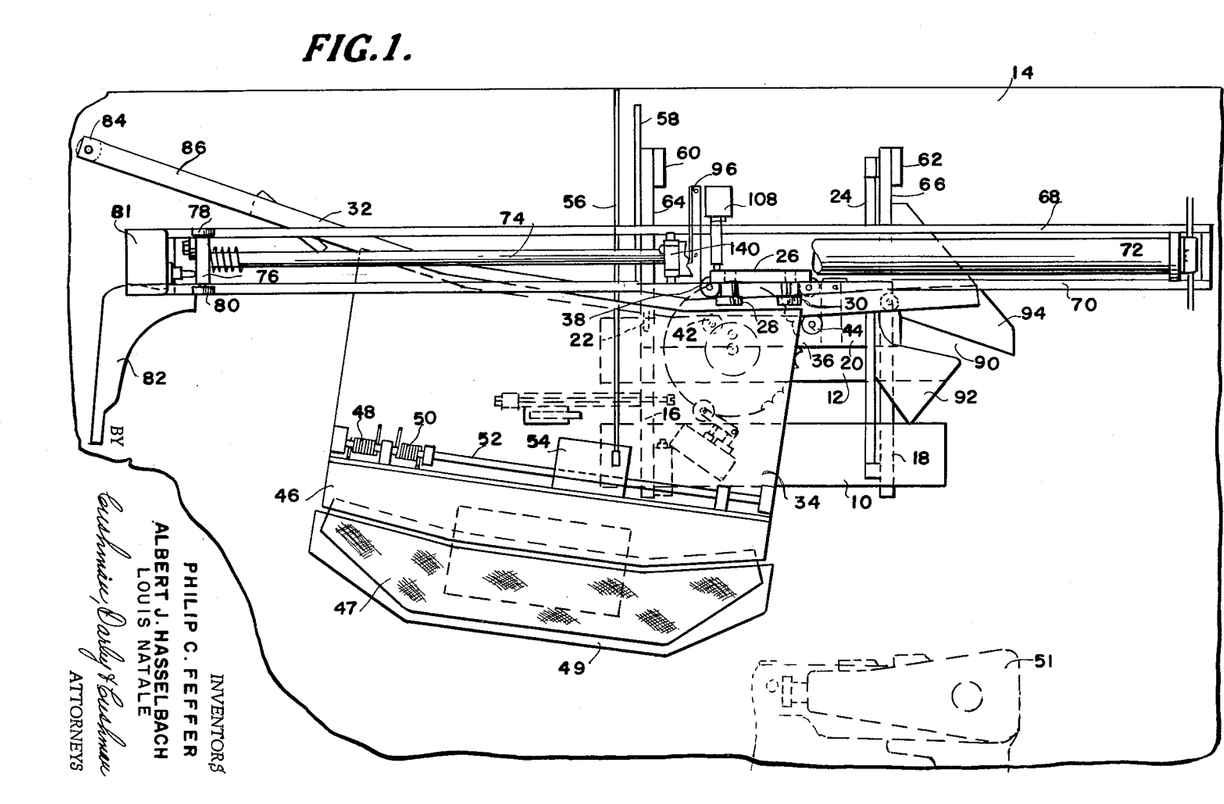
FIGURE 1 is a plan view of the undercollar apparatus shown in the load-unloaded position.

Referring to FIGURE 1 there is shown a pair of plates 10 and 12 secured in spaced relation to a table 14. Mounted on plates 10 and 12 are rail members 16 and 18. The rail members constitute tracks upon which a support plate 20 is adapted to be moved by suitable means later described. The support plate is provided at one end with a roller 22 which rides on rail member 16. At the opposite end of plate 20 and secured to the underside thereof is a guide member 23, having an opening therethrough. The guide member 23 cooperates with a rod 24 secured to rail member 18. The cooperation between the guide member 23 and rod 24 prevents displacement of the support plate 20 during movement along rail members 16 and 18.

Extending upwardly from plate 20 is a vertical member 26 to which is attached anti-friction rollers 28 and 30 engaging the upper face of a curved cam track 32 to which is secured a work supporting carriage 34.

Figure 2:
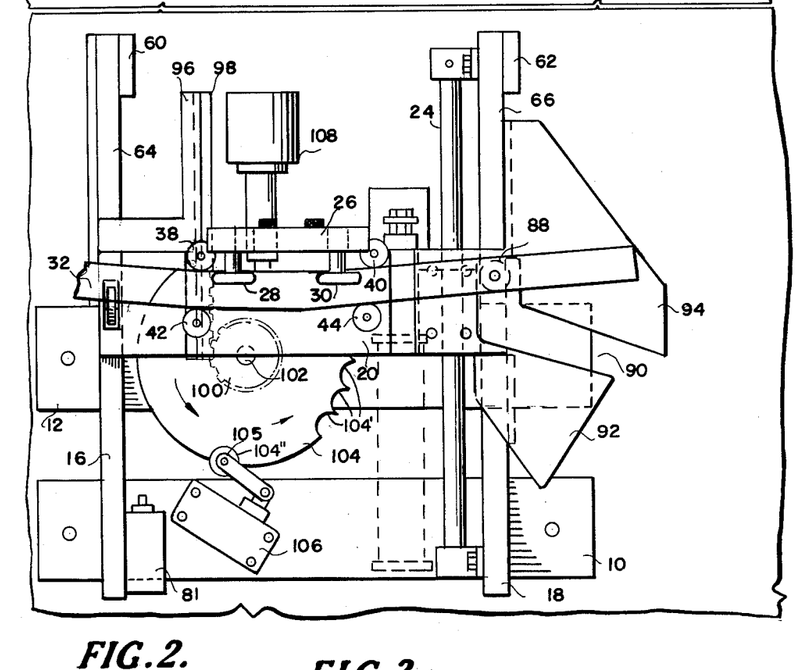
FIGURE 2 is an enlarged fragmentary view of the base assembly and the movable support for the work supporting carriage with the carriage plate and upper cylinder assembly removed.

Secured to plate 20 is a support member 36 on which is mounted anti-friction rollers 38 and 40 shown best in FIGURE 2 engaging the back face of cam track 32 and rollers 42 and 44 which engage the front face of the cam track. Also mounted on support 36 are anti-friction rollers engaging the underside of cam track 32. The carriage 34 which is secured to cam track 32 is supported in the horizontal plane by the engagement of the antifriction rollers with the cam track and a support member engaging the underside of the work supporting carriage, the details of which are later described.

The work supporting carriage 34 has pivotally mounted thereon a workpiece clamp 46 biased closed by springs 48 and 50 on rod 52 and under which is held a workpiece 47. Identical springs (not shown) are secured to the opposite end of rod 52 in the same manner. The workpiece is supported in a horizontal position on an eject plate 49 adjacent the work supporting carriage 34 before it is moved onto the work table of the sewing machine 51. The clamp 46 has a rearwardly extending portion 54 against which clamp operating lever 56 comes in contact. The clamp operating lever 56 is pivotally attached to plate 58 secured to rail member 16, although other suitable mounting means may be provided. Actuating means for clamp operating lever 56 is also secured to plate 58 as well as interlock switches, the function of which will be later described in more detail.

Vertical members 60 and 62 are secured to rail members 16 and 18 and have attached thereto support plates 64 and 66. Supported on plates 64 and 66 is an assembly comprising a pair of rails 68 and 70 to which is attached a fluid cylinder 72. A piston rod 74 which is adapted to be extended and retracted from fluid cylinder 72 has attached to its end a plate member 76 having rollers 78 and 80 thereon. Plate member 76 also actuates switch 81 when the piston rod 74 has been fully extended from its associated cylinder 72. The function of switch 81 will be later described in more detail. The rollers ride on rail members 68 and 70 when the piston rod 74 is extended and retracted from the cylinder 72. Attached to plate member 76 secured to the end of piston rod 74 is a cam 82 which coacts with a cam follower 84 secured to a support bracket 86 on one end of the cam track 32 and to the underside thereof a short distance from the opposite end is secured a second cam follower 88 that cooperates with a cam groove 90 defined by a pair of plates 92 and 94 secured to rail member 18.

In FIGURE 2 the plate 20 is shown supported on rail members 16 and 18 in the position it occupies when the apparatus is in the load-unload stage of operation. Secured to rail member 16 is a switch 81 against which plate 20 comes in contact when a workpiece is placed in its proper position in the sewing machine for the first row of stitches. When actuated by plate 20 switch 81 affects the stopping of the driving means for the support 20 and its associated work supporting carriage 34.

Secured to plate member 20 is a brace 96 carrying a rack 98. The rack 98 meshes with pinion 100 fixed on shaft 102. Also fixed on shaft 102 is a cam disc 104. The shaft 102 is rotatably mounted in plate 12 which forms part of the base of the apparatus. As the support plate 20 moves the carriage to the proper position in relation to the sewing machine, the rack 98 meshing with pinion 100 rotates the cam disc 104. On the periphery of the disc there is provided a plurality of detents which cooperate with a roller 105 mounted on actuating means for switch 106. With cam follower 88 in the position shown the movable support 20 and the carriage not shown has not been moved from its load-unload position. There is also shown secured to the brace 96, a brake 108 which when actuated contacts the back edge of cam track 32.

Figure 3:
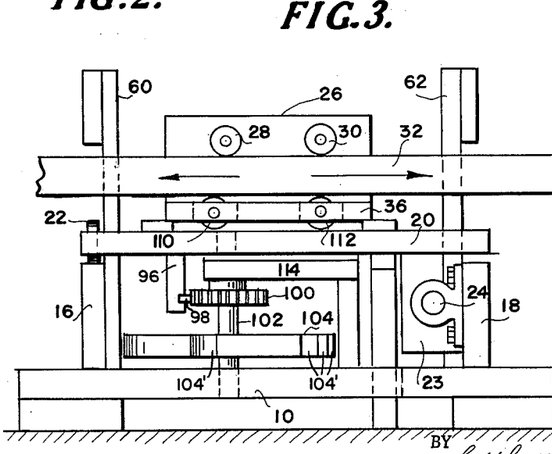
FIGURE 3 is an enlarged fragmentary front elevation view illustrating in detail the relationship between the cam track and the movable support and cam disc.

Referring to FIGURES 2 and 3, there is shown at 105 the roller which is now in a pocket 104'' in the disc 104. The shaft 102 has mounted upon it disc 104, which carries the pockets 104' as shown in FIGURES 2 and 3. Mounted above and on the shaft 102 is the pinion 100 and plate or brace 114, which holds the shaft 102 in alignment with the rack 98 shown in FIGURE 3.

In FIGURE 3 there is shown the relative position of rail members 16 and 18 with respect to the base. Also shown in the drawing are rollers 110 and 112 which are secured to support 36. Mounted on support plate 20, the rollers 110 and 112 engage the underside of cam track 32. Also shown is the guide member 23 which cooperates with the rod 24 secured to rail 18. The shaft 102 on which pinion 100 and cam disc 104 is fixed is shown rotatably mounted at one end of base plate 10 and at the other in plate 114.

Figure 4:
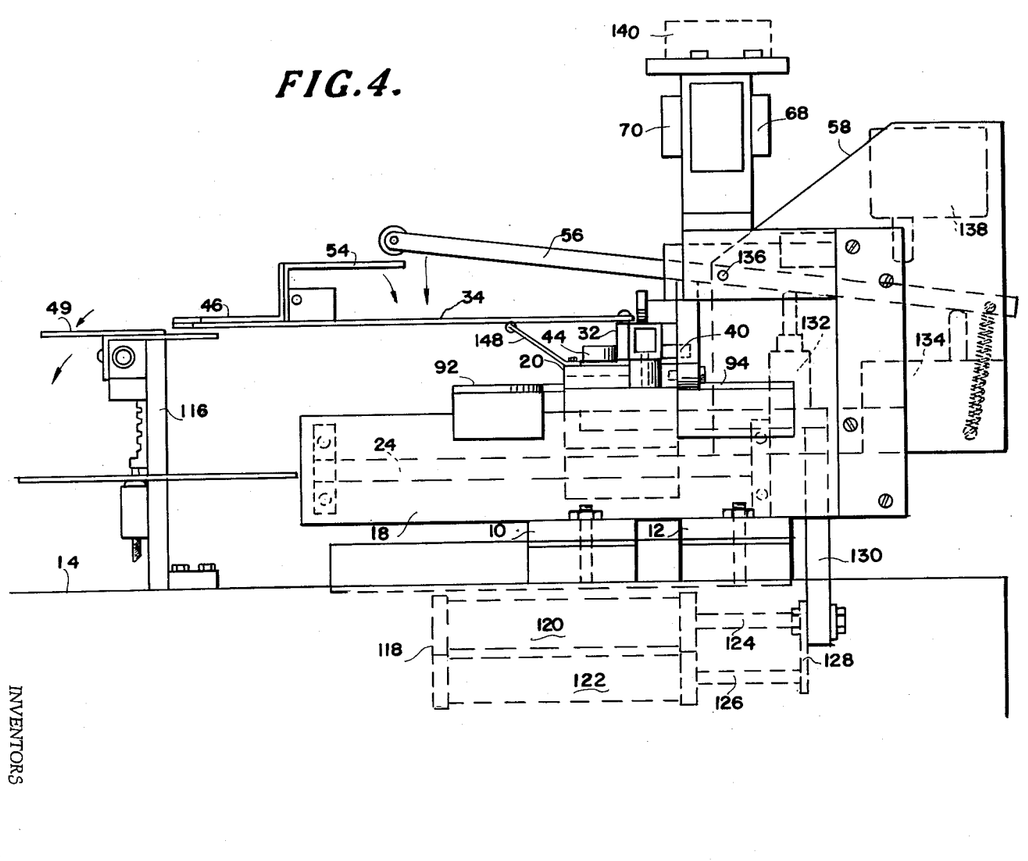
FIGURE 4 is an end view of the collar padding apparatus as shown in FIGURE 1, with the sewing machine omitted for clarity.

As shown in FIGURE 4, the end of the work supporting carriage 34 to which clamp 46 is pivotally secured is shown adjacent the eject plate 49 which is pivotally mounted on vertical support assembly 116 which is also mounted on the table 14 as shown. The eject plate 49 also serves as a support and alignment means for positioning and locating the superposed undercollar assembly in the clamp 46. Secured to the underside of table 14 is the operating mechanism 118 which moves the support plates on which carriage 34 is mounted. The mechanism 118 is a commercially available unit, marketed under the trade name Hydrocheck, and is shown by way of example as other suitable means for moving the support may be used. Hydrocheck is comprised of a pair of cylinders 120, 122, each having an associated piston within the cylinder and a piston rod secured thereto. Piston rods 124 and 126 are operatively connected together by a plate 128. A link member 130 is secured at one end to the piston rod 124 and at its other end to the movable plate 20 on which the carriage 34 is operatively mounted. Movement of the piston rods 124 and 126 is transmitted through the link 130 to cause movement of the support plate 20 and carriage 34 along the rail members 16 and 18 and guide rod 24. The operating means 132 for the clamp actuating lever 56 is shown in dotted lines secured to the plate 58. The operating means 132 for the clamp actuating lever 56 is shown as being an air cylinder; although other suitable means may be used to perform the same function.

Also secured to plate 58 are a pair of switches as previously mentioned, which detects the position of the clamp actuating lever 56. In the position shown the clamp 46 is closed and the operating lever 56 is in engagement with the actuating means of switches 134, indicating that clamp 46 is closed. When the clamp operating lever 56 is pivoted about shaft 136 the end opposite that, which contacts plate 54, comes into contact with the switch operating means associated with switch 138. This will indicate that the clamp is in an open position. Also shown is switch 140 secured to the fluid cylinder assembly and actuated by plate 76 attached to the end of piston rod 74. Switch 140 is operatively connected to the clutch actuating mechanism associated with the sewing machine, and is also shown in FIGURES 1 and 5.

Figure 5:
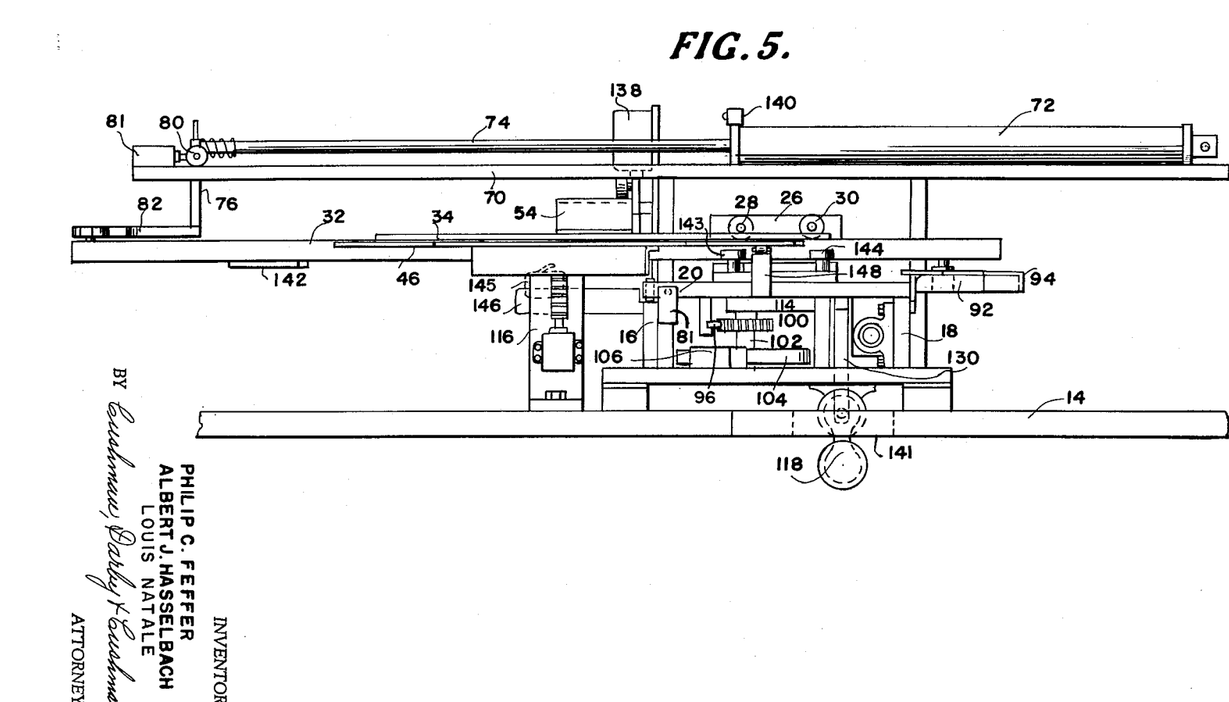
FIGURE 5 is a front elevation of the apparatus in its load-unload position, with the sewing machine omitted for clarity.

In FIGURE 5 the position of the eject mechanism is shown with respect to the base assembly on table 14. The table 14 is provided with an opening 141 in which the cylinder assembly 118 is situated. Secured to the underside of the cam track 32 is a cam member 142. When the carriage assembly reaches the end of its travel with respect to the support plate 20, after a row of stitches has been sewed in the undercollar, the cam member 142 comes in contact with, and actuates switch 145 mounted on support plate 146 secured to rail member 16. The switch 145 as one of its functions, stops the sewing machine when it is actuated by cam 142. The switch is adjustable bodily with respect to support 146 whereby the length of a row of stitches can be varied, depending on the size of the work-piece to which the stitches will be applied. A vernier mechanism, not shown, is used to adjust the switch 145 relative to support 146. Also shown in FIGURE 5 are rollers 143 and 144 engaging the front face of cam track 32. To give added support to carriage 34 a brace 148 is secured to the movable plate 20 at one end, and a roller carried at the other end is in contact with the underside of the work supporting carriage 34.

Figure 6:
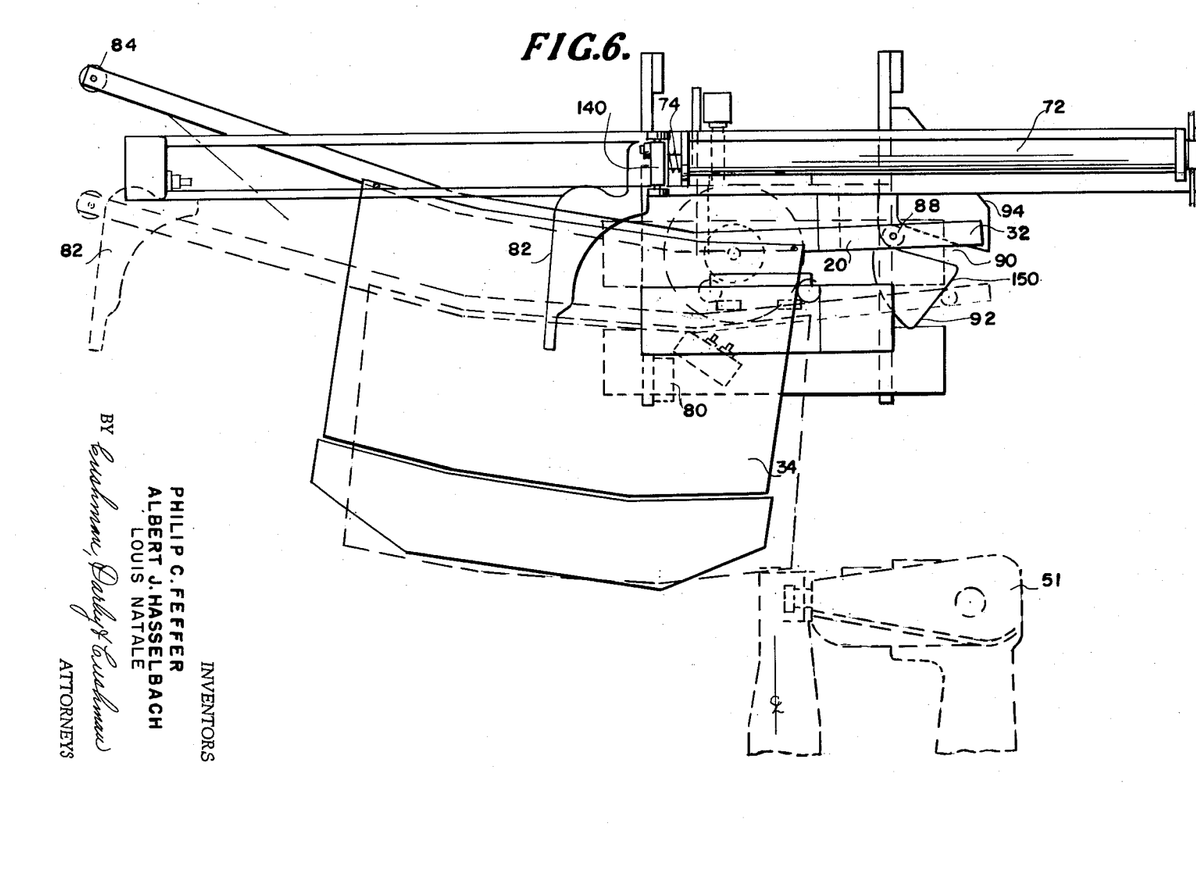
FIGURE 6 is a plan view of the undercollar padding apparatus moving toward the sewing machine whereby a work piece will be placed in the proper position for the application of a row of stitches.

Referring to FIGURE 6 the support 20 has moved the carriage 34 toward the sewing machine 51. The cam follower 88 attached to the end of cam track 32 has moved along a portion of the cam groove 90 defined by plates 92 and 94. Continued movement of the support 20 toward the sewing machine will cause the cam follower 88 to continue in the cam track 90 until it reaches the end of the portion of the track defined by plate 92. When the cam follower 88 reaches this position the cam follower 84 secured to the opposite end of cam track 32 comes in contact with cam 82. The cooperation between cam follower 84 and cam 82 will cause the cam follower 88 to move along the face portion 150 of plate 92, to bring the carriage 34 supporting the workpiece to the position adjacent the sewing machine as shown by the dotted lines. As the carriage 34 is moving the workpiece to its proper position relative to the sewing machine 51, the piston rod 74 is being retracted into the cylinder 72 carrying with it cam 82. When this occurs cam 82 moves out of contact with cam follower 84. When the carriage reaches its dotted line position, the plate 20 comes in contact with and actuates switch 80, which effects the stopping of the mechanism 118 that moves the carriage assembly.

Figure 7:
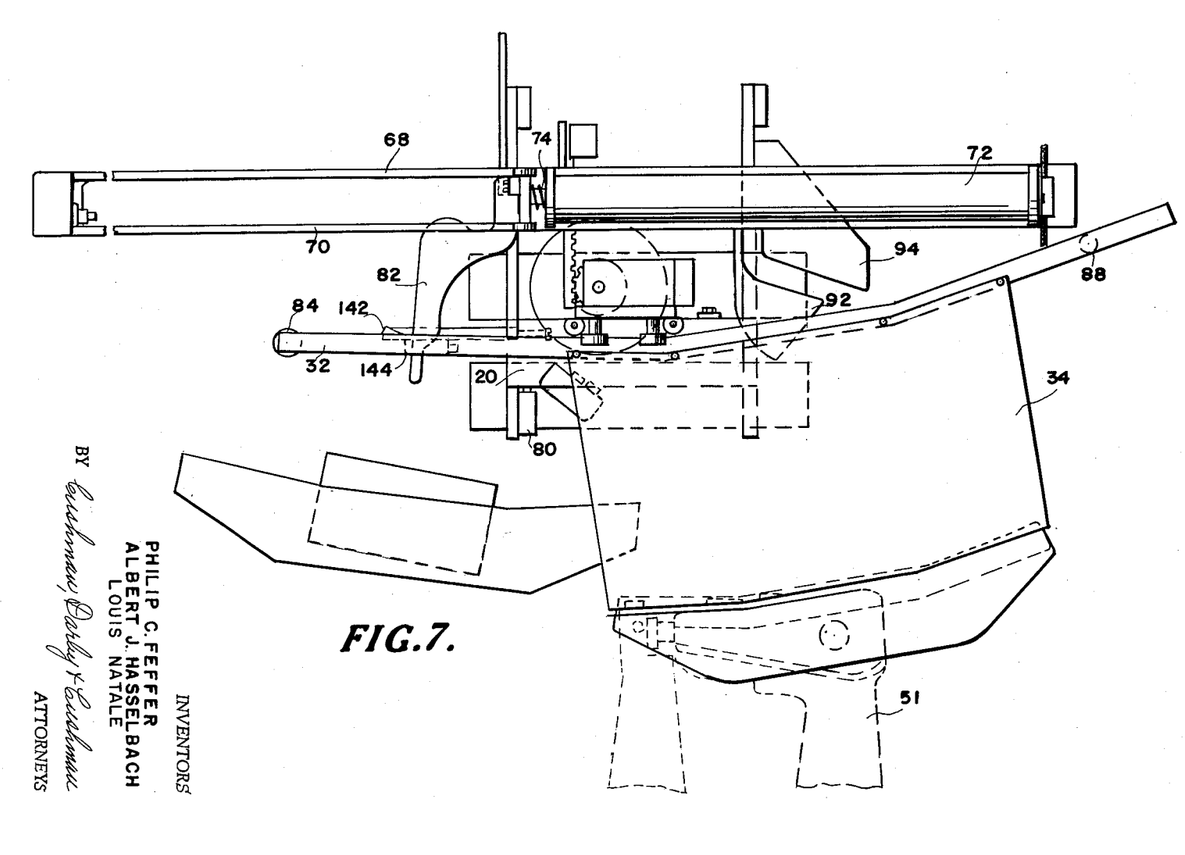
FIGURE 7 is a plan view showing the position of the carriage after one row of stitches has been sewn into the undercollar.

As shown in FIGURE 7 the carriage 34 has been moved by the sewing action of the sewing machine drawing the undercollar between the foot and the needle. Switch 145 has been actuated by cam 142 secured to the underside of cam track 32. When this occurs, the sewing machine stops, as previously mentioned, the presser foot of the sewing machine opens and the mechanism 118 secured to support 20 causes the carriage to move away from the sewing machine to position it at the proper point for the application of a second row of stitches. During the movement of the support 20 away from the sewing machine, the piston rod 74 is extended from the cylinder 72. The cam 82 engages the cam follower 84 on the end of cam track 32 and moves the carriage 34 back to a start position. The carriage is moved through an arcuate path due to the cooperation of the curved configuration of the track 32 and its coaction with the rollers engaging the faces thereof.

Figure 8:
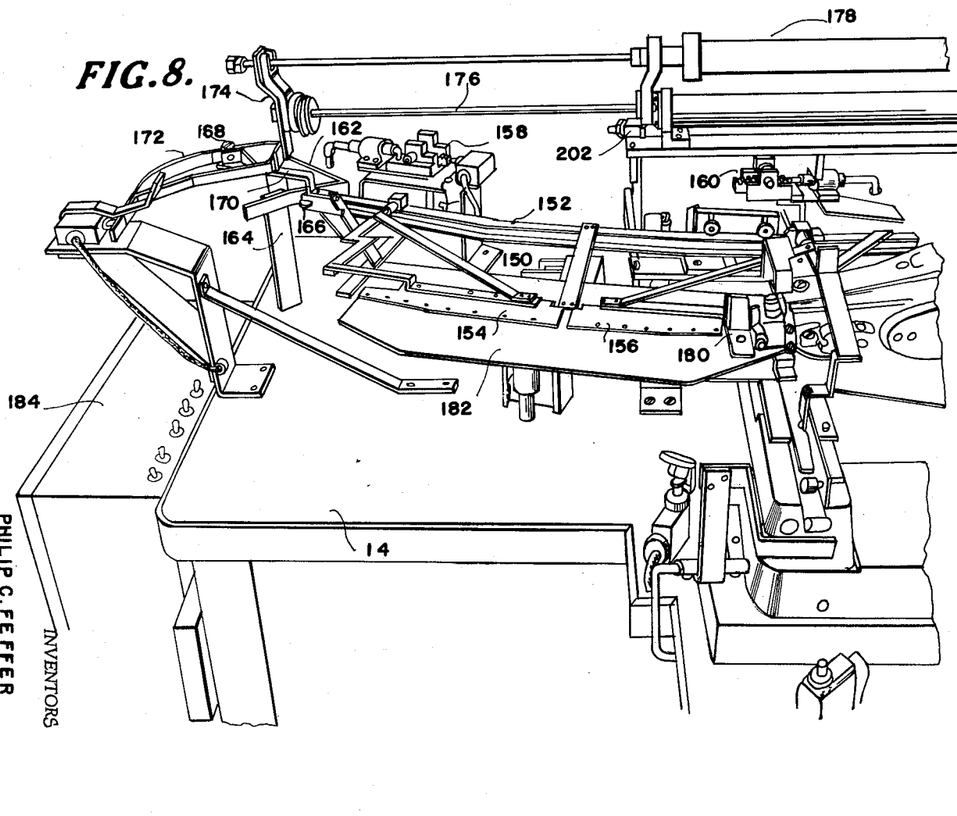
FIGURE 8 shows an apparatus for padding undercollars illustrating a slightly different construction.

Referring to FIGURE 8 a modified work supporting carriage 150 is shown secured to a cam track 152 which is guided by rollers in the same manner as the cam track 32 as shown in FIGURE 1. The cam track 152 has the same configuration whereby the work piece is moved through the sewing machine in an arcuate path. A work piece clamping means is comprised of a pair of pivoted plate members 154 and 156 under which the assembly of undercollar and canvas are placed and held. The clamping plate members are pivoted by clamp actuating means 158 and 160 when the carriage 150 is in the load-unload position. The mechanism for moving the carriage whereby the work piece is brought into operative engagement with the sewing machine is the same as that shown in FIGURE 4 and indicated by the number 118. The movement of the work supporting carriage 150 for the proper placement of the work piece on the presser foot of the sewing machine is accomplished somewhat differently. A substantially V-shaped cam 162 is secured to a support 164 mounted on table 14. The cam track 152 has at its extreme end a cam follower 166 in the form of a roller which cooperates with the face of cam 162. The cam follower 166 is held in contact with the face of cam 162 by the cooperation of a cam follower 168 attached to supporting bracket 170, which is secured to the end of cam track 152, and a cam 172 which is secured to plate 174 connected to piston rod 176 forming part of cylinder assembly 178. The cylinder assembly 178 as shown, is the same type of unit as number 118 in FIGURE 4 and is also available commercially under the trade name Hydrocheck.

The sewing machine has attached to the head portion a guide bar 180 under which the workpiece will pass when it is moved into sewing engagement by the work supporting carriages 150. Adjacent the work supporting carriage 150 is a work piece ejecting mechanism 182 which after all of the sewing operations have been completed and clamp members 154 and 156 have been moved to an open position ejects the work piece from the work supporting carriage 150.

Also shown in FIGURE 8 is a portion of the box 184 which houses the control system. One of the components of the system is a stepping switch (not shown) which is available commercially and is particularly suited to an operation having sequential steps. The switch is provided with contacts which complete circuits to the various switches positioned on the apparatus and which will be described in more detail when an explanation of the operation of the apparatus is given.

Figure 9:
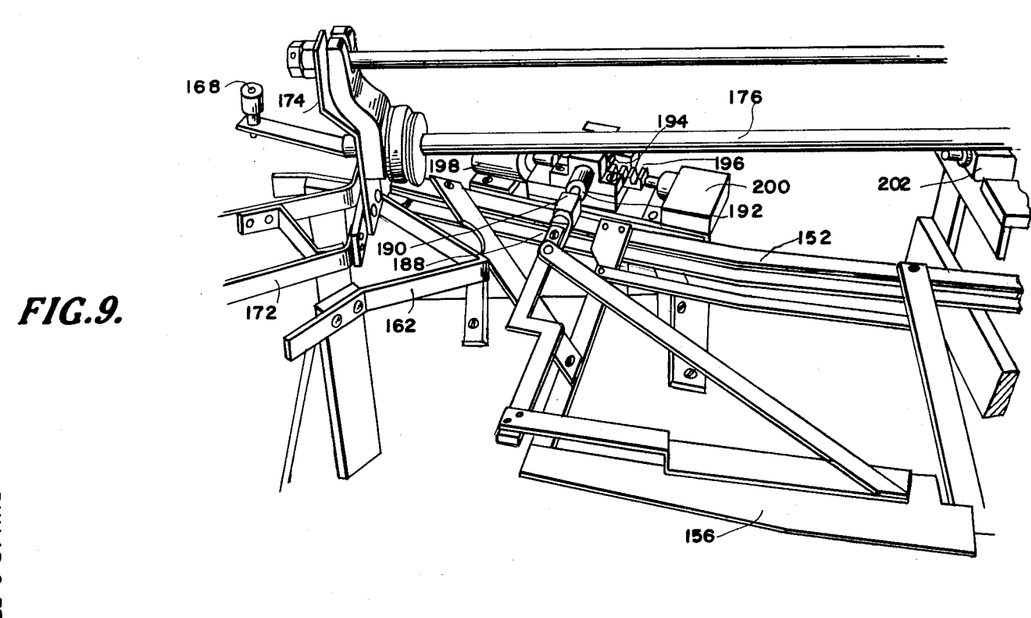
FIGURE 9 is an enlarged fragmentary view of FIGURE 8 showing in detail one of the workpiece clamps and the actuating mechanism therefor.

In FIGURE 9 there is shown in the drawing one of the work piece clamping members 156 connected by supporting members to a rotatable shaft 188 part of which extends through bearing block 190 secured to cam track 152. When the carriage is in its load-unload position the portion of the shaft 188 which extends through the bearing block 190 enters an opening in a rotatable socket 192 socket is fixed to a shaft upon which pinion 194 is also fixed. The pinion is driven by a rack 196 actuated by air cylinder 198. An interlock switch 200 is shown mounted adjacent the clamp actuating mechanism. The operating means for the switch is positioned so that the rack 196, when moved by the air cylinder 198, will actuate the switch. The function of this switch is to indicate the position of the workpiece clamping plate 156, i.e., whether it is open or closed. Also the switch 200 is interlocked with the ejecting mechanism operating means in such a manner as to prevent the actuation of the eject means when the workpiece clamping plate is closed. Also shown is a switch 202 which is actuated by plate 174 engaging the switch actuating means when the piston rod 176 is retracted into its associated cylinder. The function of switch 202 is that of an interlock which will prevent actuation of the sewing machine until the piston rod 176 has been fully retracted into its cylinder. Shown in more detail is the V-shape cam 162 which assists in guiding the work supporting carriage to its proper position adjacent the sewing machine when the carriage support moves the carriage.

Figure 10:
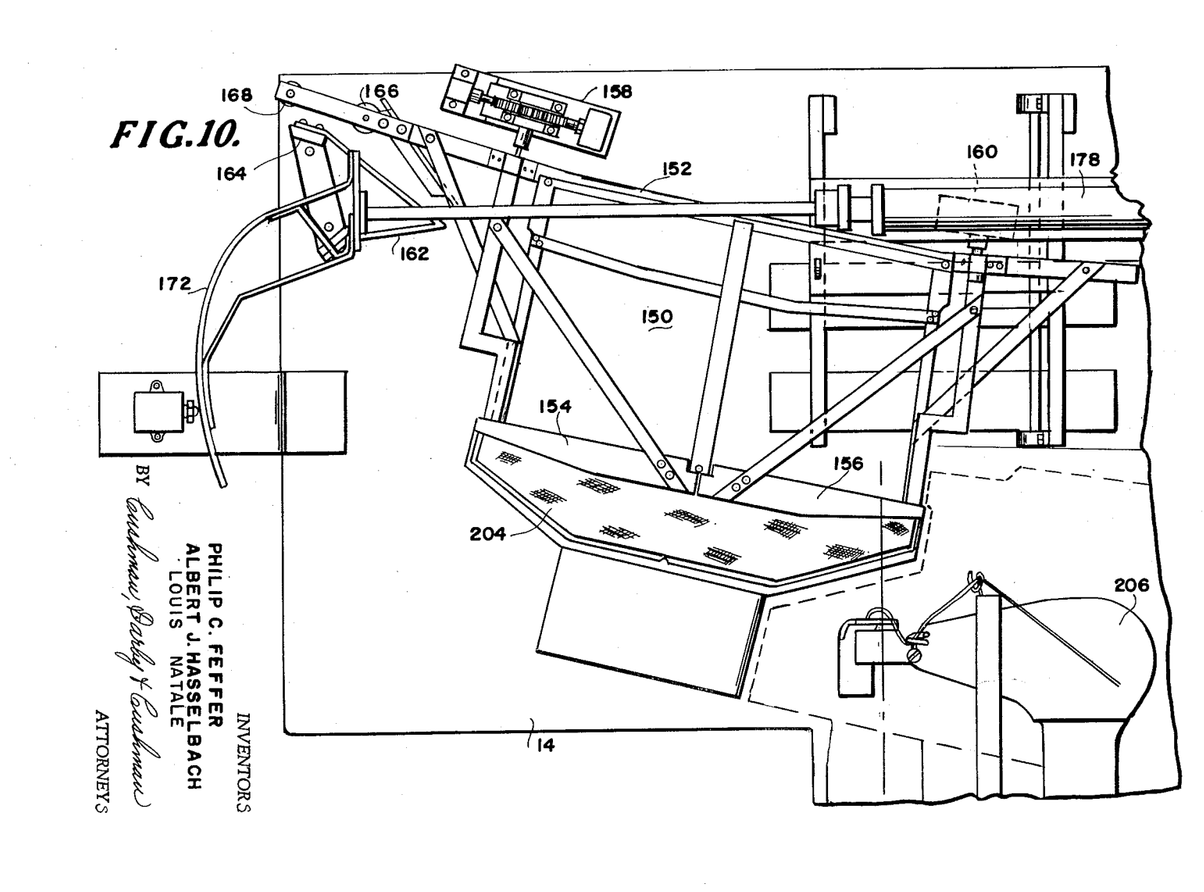
FIGURE 10 is a plan view of the collar padding apparatus shown in perspective in FIGURE 8.

In FIGURE 10 the apparatus shown in the load-unload position having had an undercollar assembly 204 positioned on the work supporting carriage 150 and held by clamping plates 154 and 156. The clamping plates have been moved to their closed position by their associated operating mechanisms 158 and 160. The apparatus as shown has not yet started its movement to place the workpiece in sewing engagement with the sewing machine 206.

Figure 11:
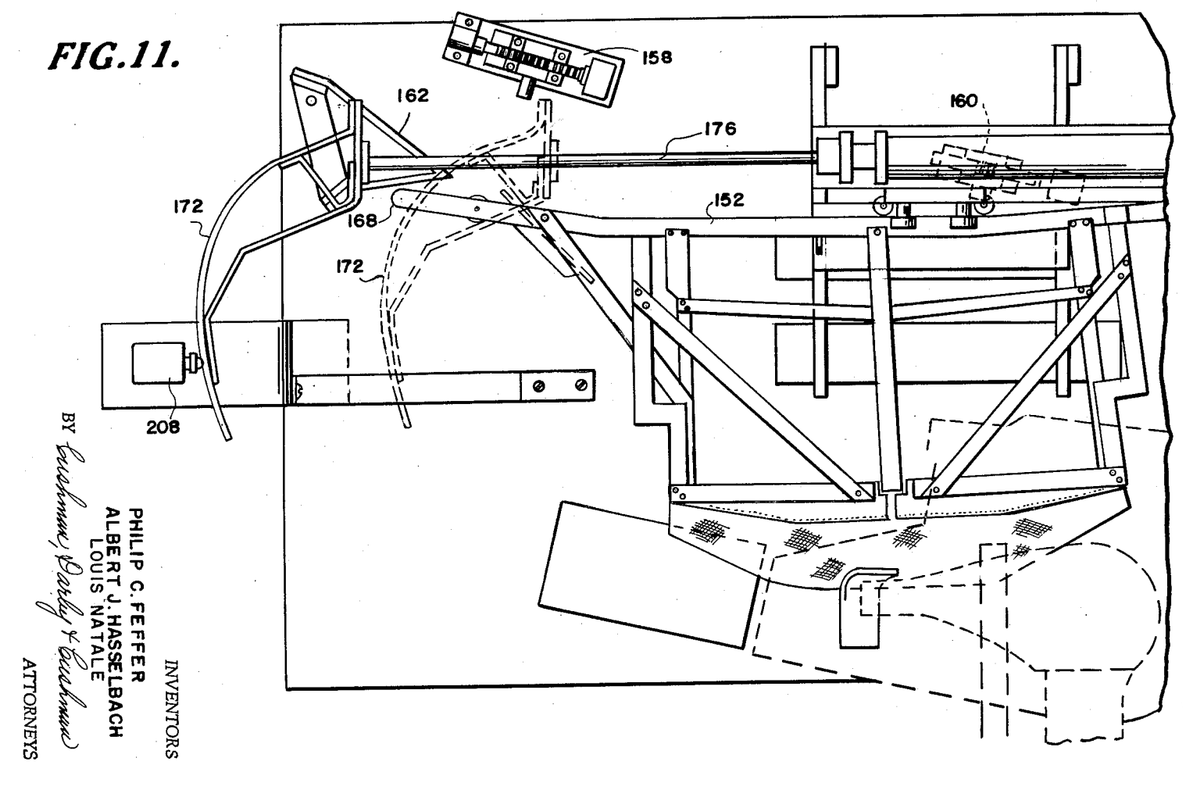
FIGURE 11 is a plan view of the apparatus after a row of stitches has been applied to an undercollar assembly and the carriage is being returned to a starting position.

In FIGURE 11 as shown, the apparatus has carried the undercollar assembly through the sewing machine whereby a row of stitches has been applied. In the position shown the carriage 150 has been partially returned to its start position by the cam 172 shown in dotted lines, cooperating with cam follower 168, secured to the end of cam track 152. The piston rod 176 to which the cam 172 is attached has only been partially extended from its associated cylinder to bring the cam 172 to the dotted line position. Shown in solid lines the cam 172 and piston rod 176 has reached a fully extended position. When the cam 172 has reached the position as shown in solid lines, it contacts switch 208 which is connected through appropriate circuitry to the stepping switch housed in the control panel 184. This will advance the stepping switch one position and then the piston rod will be retracted within the cylinder carrying cam 172 with it until it reaches a fully retracted position whereby plate 174 actuates switch 202 which is an interlock connected to the clutch control for the sewing machine.

Figure 12:
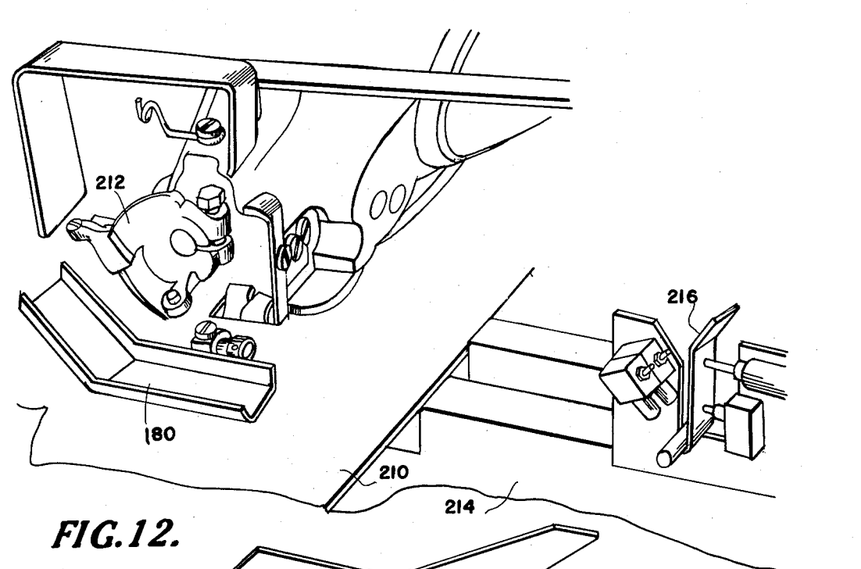
FIGURE 12 is an enlarged fragmetary view of the sewing machine head and a portion of the control switches attached to the sewing machine.

In FIGURE 12 the position of the workpiece guide 130 is shown attached to a work table 210 secured to the sewing machine. The sewing machine used in combination with the collar padding apparatus is a commercial machine manufactured by the Lewis Invisible Stitch Machine Company, and similar to the blind stitch sewing machine in Mueller et al. Patent No. 2,632,416, dated March 24, 1953, and assigned to the above-mentioned company.

As shown the sewing machine is provided with the customary needle assembly 212 which is the type commonly used with a blind stitch sewing machine. Also shown secured to the transversely extending portion of the work table support 214 is part of the control means 216 for the apparatus.

Figure 13:
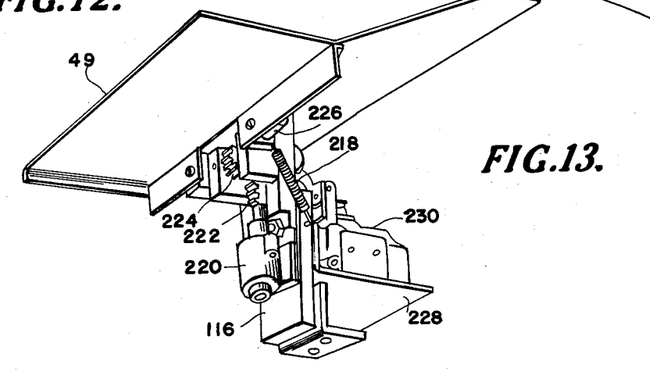
FIGURE 13 is a detailed view of the undercollar ejecting means and the operating mechanism therefore.

As shown in FIGURE 13, the ejecting means comprises an ejecting plate 49 pivotally secured to the vertical support 116 which is mounted on the table 14. The eject plate 49 is spring biased in a horizontal position by spring 218. The actuating means to pivot eject plate 49 is comprised of an air cylinder 220, a rack 222, and a pinion 224 is moved and rotates the pinion 224 with which it meshes. The pinion 224 is fixed on rotatable shaft 226 which is secured to the underside of eject plate 49 so that when pinion 224 is rotated the eject plate will be moved from its normal horizontal position to a substantially vertical eject position. Mounted on plate 228 secured to the vertical member 116 is a switch 230 which is connected by appropriate circuitry to the stepping switch in the control panel 184. The function of switch 230 will be explained in detail during the description of operation.

Figure 14:
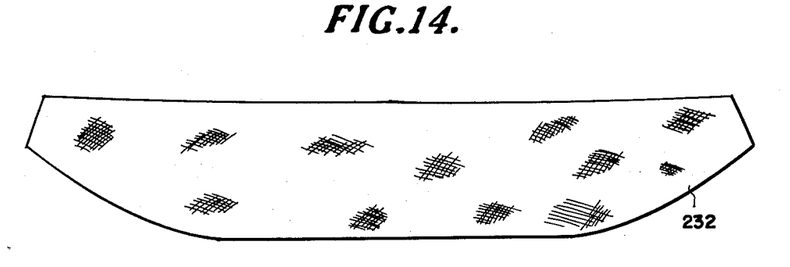
FIGURE 14 is a plan view of the stiffening member or canvas forming part of the undercollar assembly.

Shown in FIGURE 14 is the stiffening member or canvas 232 which is an open weaved material formed of rather coarse textile threads.

Figure 15:
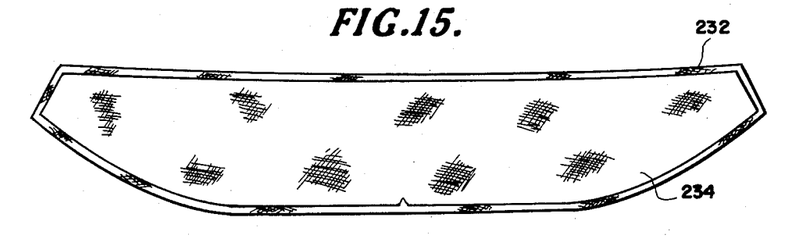
FIGURE 15 is a plan view of the assembled undercollar.

As shown in FIGURE 15, the stiffening or canvas 232 has laid thereon the undercollar material 234 forming an undercollar assembly.

Figure 16:
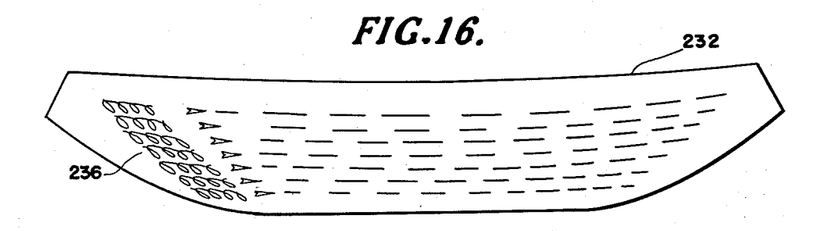
FIGURE 16 is a plan view of the bottom side of the assembled undercollar having been stitched on the apparatus in accordance with the teaching of the invention.

In FIGURE 16, there is illustrated the bottom side of the undercollar assembly showing the stiffening or canvas 232 and the desired number of rows of stitches 236 which have been applied through the canvas 232 and part way through the undercollar material 234.

Figure 17A:
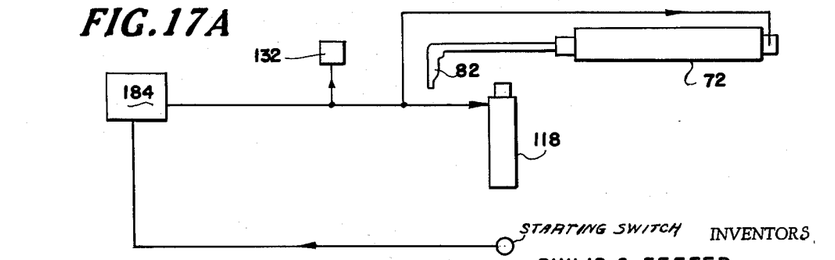
FIGURE 17A diagrammatically illustrates the actuation of the clamp means and the initial movement of the carriage operating mechanism.

Diagrammatically shown in FIGURE 17A is the actuation of the operating means 132 for the clamp actuating lever. Also shown is the operating mechanism 118 which moves the support plate on which the work supporting carriage is movably mounted, the cylinder 72 which causes extension and retraction of cam 82 and the control box 184 which houses the stepping switch previously mentioned. Upon actuation of the starting switch the stepping switch housed in control box 184 is advanced one step whereby the operating means for the clamp actuating lever is actuated, causing the clamp to close on the workpiece. Almost simultaneously, the mechanism 118 which moves the work supporting carriage toward the sewing machine is actuated and the cam 82 is retracted toward the cylinder 72. The rate of movement of the cam 82 is somewhat less than the rate of travel imparted to the work supporting table by the operating mechanism 118.

The cam 82 is not retracted until after the work supporting table reaches its stop position at which time the clutch mechanism of the sewing machine is caused to be engaged.

Figure 17B:
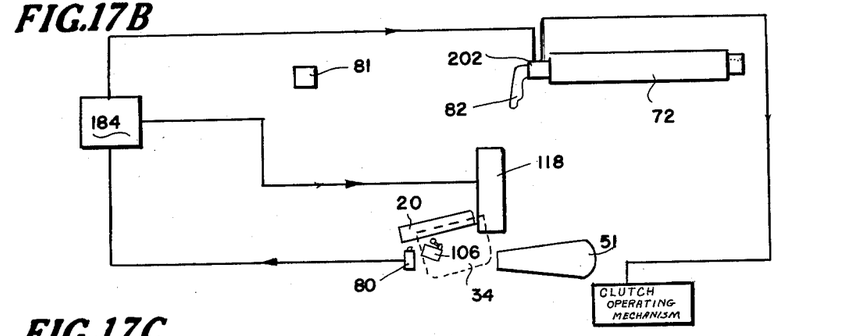
FIGURE 17B illustrates diagrammatically the work supporting carriage shown in dotted lines having been moved to place the workpiece in the proper position on the sewing machine.

FIGURE 17B illustrates the carriage 34 having moved to its proper position in relation to the sewing machine 51 whereby the workpiece is placed in position to have a row of stitches applied thereto. When the carriage reaches this position, the support plate 20 on which the carriage is mounted, actuates switch 80 which advances the stepping switch one step and a signal is carried to the actuating means 118 which causes it to stop. When the undercollar assembly has been placed on the sewing machine, the presser foot on the sewing machine closes.

Almost simultaneously with the closing of the presser foot, the cam 82 reaches its fully retracted position and actuates interlock switch 202 connected to the clutch operating mechanism of the sewing machine.

Upon actuation, the sewing machine applies a row of stitches to the assembled undercollar which is drawn through the machine by the stitch applying action thereof. Due to the curved configuration of the cam track 32 and its cooperation with the rollers mounted on their related supports on support plate 20, the undercollar assembly is guided through the sewing machine in an arcuate path.

Figure 17C:
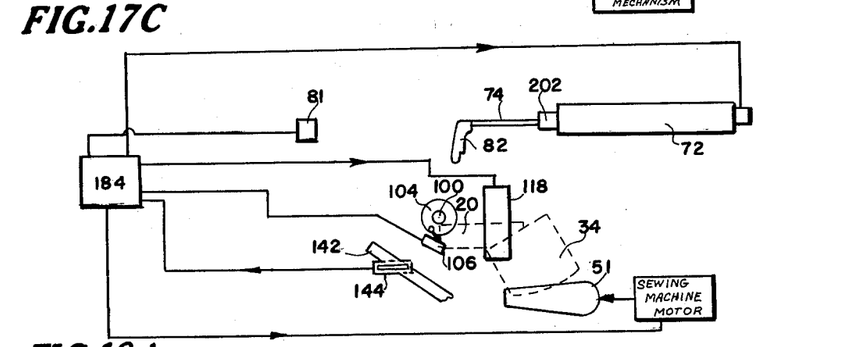
FIGURE 17C illustrates the position of the work supporting carriage after a row of stitches has been applied to the undercollar assembly.

Referring to FIGURE 17C there is diagrammatically shown the position of the work supporting carriage 34 after having been moved with the undercollar assembly through the sewing machine which has applied one row of stitches to the undercollar. When the carriage reaches the dotted line position, the cam 142 secured to the underside of cam track 32 actuates switch 144. When this occurs, the stepping switch housed in the control box 184 is advanced one step whereby a signal is sent to the operating means for the sewing machine to cause it to stop. When the sewing machine stops, the presser foot associated therewith opens and releases the undercollar assembly. A signal is sent to the operating mechanism 118 which moves the support 20 and work supporting carriage 34 in a direction away from the sewing machine. At the same time, a signal is transmitted to the operating means for cylinder 72, whereby the cam 82 attached to the piston rod 74 is moved toward its extended position. During the movement of support 20 and carriage 34, in a direction away from the sewing machine, the rack 98 associated with the support plate 20 meshes with and rotates pinion 100 whereby cam disc 104 is rotated. Switch 106 is associated with, and has actuating means cooperatively engaging the periphery of the cam disc. As previously mentioned, the cam disc has a plurality of detents situated in its periphery. When the actuating member for switch 106 drops into the detent next to that in which it is presently situated, the switch 106 causes the stepping switch to advance one step, whereby a signal is transmitted to the carriage operating mechanism 118 to stop same. The cam 82 reaches its fully extended position and actuates switch 81 which advances the stepping switch one step. While the cam is being moved to its fully extended position, it cooperatively engages cam follower 84 secured to the support 86 on cam track 32, whereby the carriage 34 will be returned to a start position.

The previously described operations diagrammatically shown in FIGURES 17A, B and C are repeated whereby as many rows of stitches as desired are applied to the undercollar assembly. The operation required to apply succeeding rows of stitches is identical.

Figure 18A:
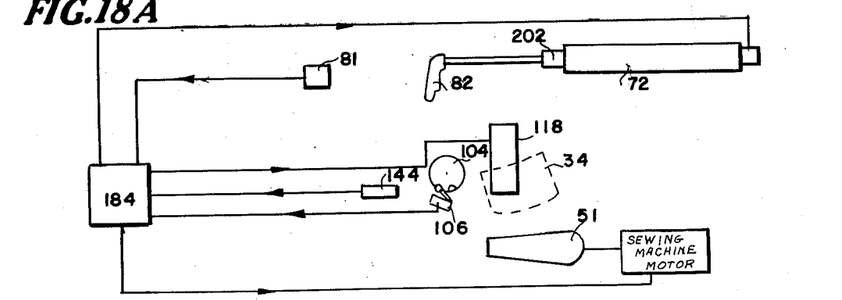
FIGURE 18A is a diagrammatical view showing the position of the carriage after the last row of stitches has been applied to the undercollar assembly.

Shown in FIGURE 18A is the position of the work supporting carriage 34 after the last row of stitches has been applied by the sewing machine 51 to the undercollar assembly. When the carriage reaches the position shown, the cam 142 secured to the underside of the cam track 32, actuates switch 144 in the same manner and at the same stage of operation as described in FIGURE 17C. When switch 144 is actuated, it advances the stepping switch housed in the control box 184 one step whereby a signal is transmitted to the sewing machine operating mechanism causing the cessation of the sewing operation. When this occurs, the foot of the sewing machine opens and releases the undercollar assembly from operative engagement with the sewing machine. A signal is transmitted to the operating mechanism 118 which moves the work supporting carriage 34 in a direction away from the sewing machine 51. Almost simultaneously, with the movement of carriage 34 away from the sewing machine, the cam 82 is being moved to a fully extended position from the cylinder 72, the operating means of which has received an actuating signal from the controls in box 184. The carriage 34 while moving away from the sewing machine as previously mentioned, causes cam 104 to be rotated, whereby the actuating means for switch 106 enters the next to last detent on the cam which causes the stepping switch to advance one step. When the cam member 82 reaches its fully extended position, it actuates switch 81 which causes a one step advancement of the stepping switch. The cam member 82 remains in its fully extended position, therebeing no further signal transmitted to cylinder 72. The work supporting carriage operating mechanism 118 continues moving the carriage 34 in a direction away from the sewing machine and toward the load-unload position. During the movement of the carriage 34, the cam disc 104 continues to be rotated. The actuating means for switch 106 drops into the last detent on the cam disc when the carriage has reached the load-unload position. The switch 106 causes the stepping switch to be advanced one step whereby a signal is transmitted to the carriage operating mechanism 118 causing same to stop.

Figure 18B:
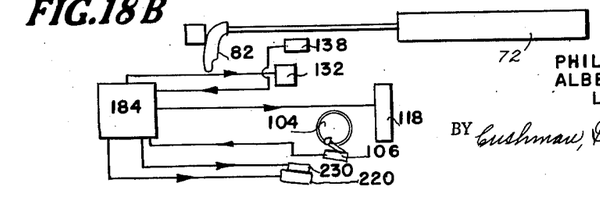
FIGURE 18B is a diagrammatical view of the clamp operating means and of the eject plate whereby the work piece is ejected from the work supporting carriage.

As shown in FIGURE 18B, the actuating means for switch 106 has dropped into the last detent on cam disc 104, thus causing the stepping switch housed in the control box 184 to move to its last position. Also, the operating mechanism 118 has moved the work supporting carriage to the load-unload position and is stopped. A signal is transmitted to the clamp operating mechanism 132 which through clamp operating lever 56 causes clamp 46 to open, releasing the undercollar assembly. The interlock switch 138 is actuated, which signals that the clamp 46 is open and allows the eject plate operating mechanism 220 to pivot the eject plate to a substantially vertical position, whereby the undercollar assembly is ejected from the work supporting carriage 34. When the eject plate reaches the fully extended position, switch 230 secured to plate 228 mounted on vertical support member 116 is actuated and advances the stepping switch in the control box 184 to its first position, whereby the apparatus will be ready to begin a complete cycle on another undercollar assembly.

The operation of the apparatus shown in FIGURES 8 through 11 is substantially identical to that of the apparatus shown in FIGURES 1 through 7. The most notatable exception, of course, resides in the operating mechanism for the clamping members 154 and 156. When the work supporting carriage 156 has been returned to the load-unload position, the rotatable shafts to which the clamping members 154 and 156 are attached, enter rotatable sockets which are actuated by air cylinder means and a rack and pinion arrangement which imparts a rotary motion to the shafts to move the clamping plates to an open or closed position.

What is claimed is:

1. An apparatus for sewing together a plurality of superimposed layers of workpiece material by means of a plurality of laterally spaced generally parallel independent lines of stitches having a predetermined form comprising in combination: a sewing machine adapted to impart feeding movement to the workpiece during application of a line of stitches thereto; a base member adjacent and fixed relative to said sewing machine, a support member movably carried by said base member; support member moving means adapted to move said suport member toward and away from said sewing machine in a direction transverse to the direction of the feeding movement imparted by said sewing machine, a workpiece supporting carriage movably carried by said support member, said carriage being movable from a load-unload position to a position placing the workpiece in operational engagement with said sewing machine; a workpiece holding means carried by said carriage adapted to hold said layers of workpiece material in superimposed relation during application of the lines of stitches thereto; a cam track member carried by said workpiece supporting carriage and fixed relative thereto; said cam track having a configuration corresponding to the form of the lines of stitches and extending in a direction corresponding to the direction in which the lines of stitches are to extend; cam track member engaging means carried by said support member movably engaging said cam track member so as to limit the movement of said workpiece supporting carriage relative to said support member to a path determined by the configuration of said cam track member; cooperating cam and cam follower means carried by said carriage and said base member, said cooperating cam and follower means being in operative engagement when said carriage is in said load-unload position and adapted to effect movement of said carriage relative to said support member in a direction generally corresponding to the direction of the feeding movement imparted by said sewing machine in response to movement of said support member toward said sewing machine to thereby place said workpiece in operational engagement with said sewing machine for the application of a first line of stitches; means operatively responsive to the positioning of said workpiece in operative engagement with said sewing machine to stop movement of said support member relative to said sewing machine and effect actuation of said sewing machine to impart feeding movement of said workpiece and apply a line of stitches thereto, the feeding movement imparted to said workpiece effecting movement of said carriage relative to said support member whereby the path of movement of said workpiece relative to said sewing machine will be determined by said configuration of said cam track member to thereby provide a line of stitches having a form corresponding to said configuration of said cam track member; means operatively responsive to the position of said carriage upon the completion of a line of stitches to successively effect release of the workpiece from the sewing machine and actuate said support moving means so as to move said support member relative to said sewing machine a distance corresponding to the lateral spacing between adjacent lines of stitches; cam follower means secured to said carriage; a reciprocable cam member cooperating with said cam follower means to move said carriage relative to said support member to thereby place said workpiece in said operational engagement with said sewing machine for the application of a succeeding line of stitches; means operatively responsive to the position of said carriage upon the completion of the last of the plurality of said lines of stitches operative to effect the release of said workpiece from said sewing machine and to actuate said support moving means and said reciprocable cam member whereby upon the completion of the application of the last line of the stitches to said workpiece, said workpiece will be released from said sewing machine and said carriage will be returned to said load-unload position.

2. The structure defined in claim 1 wherein the workpiece holding means includes a clamping member movably carried by the carriage so as to be movable into and out of clamping engagement with the layers of workpiece material.

3. The structure defined in claim 2 which includes means operatively responsive to the return of the carriage to the load-unload position upon completion of the application of the last line of stitches to effect movement of the clamping member out of clamping engagement with the layers of workpiece material.

4. The structure defined in claim 3 which includes a workpiece ejecting means adjacent the carriage in the load-unload position adapted to remove the layers of workpiece material from operative association with the workpiece holding means when said clamping member is moved out of clamping engagement with the layers of workpiece material.

5. An apparatus for padding undercollars by means of a plurality of laterally spaced independent lines of stitches having a predetermined form including a sewing machine adapted to impart feeding movement to the work during application of a line of stitches thereto, a base adjacent said sewing machine, a support mounted on said base, a work supporting carriage on said support and movable with respect thereto, a work holding means carried by said carriage adapted to hold said work during application of the line of stitches thereto, means moving said support and said carriage adjacent said sewing machine to a position placing the work in operational engagement with said sewing machine, said carriage being movable with respect to said sewing machine during a plurality of sewing operations in a path corresponding to the predetermined form of the line of stitches being applied, said support being movable toward and away from said sewing machine in a direction transverse to the direction of feeding movement imparted by said sewing machine, a cam follower secured to said carriage, a reciprocable cam cooperating with said cam follower positively returning said work supporting carriage to a starting position after each of said sewing operations, means operatively responsive to the position of said carriage upon the completion of a line of stitches to effect actuation of said support and said carriage moving means so that said work is positioned in operational engagement with said sewing machine for the application of a succeeding line of stitches laterally spaced from the preceding line of stitches and means ejecting the work when said sewing operations have been completed.

References Cited in the file of this patent

UNITED STATES PATENTS

| | | |
|---|---|---|
| 1,243,679 | Allen | Oct. 23, 1917 |
| 1,412,225 | Winkley | Apr. 11, 1922 |
| 1,729,225 | Mayo | Sept. 24, 1929 |
| 2,418,356 | Kleber | Apr. 1, 1947 |
| 2,574,269 | Lange | Nov. 6, 1951 |
| 2,899,919 | Myska | Aug. 18, 1959 |
| 2,989,013 | McGill et al. | June 20, 1961 |
| 3,001,489 | Bond et al. | Sept. 26, 1961 |
| 3,008,437 | Herr | Nov. 14, 1961 |
| 3,037,472 | Lockwood | June 5, 1962 |
| 3,042,171 | Rose | July 3, 1962 |
| 3,053,204 | Kelemencky | Sept. 11, 1962 |
| 3,062,161 | Klaning et al. | Nov. 6, 1962 |
| 3,072,081 | Milligan et al. | Jan. 8, 1963 |
| 3,073,267 | Reeber et al. | Jan. 15, 1963 |
| 3,084,640 | Hayes et al. | Apr. 9, 1963 |
| 3,089,441 | Herr et al. | May 14, 1963 |
| 3,097,617 | Reid et al. | July 16, 1963 |

FOREIGN PATENTS

| | | |
|---|---|---|
| 1,240,493 | France | July 25, 1960 |
| 847,545 | Great Britain | Sept. 7, 1960 |